US005533929A

United States Patent [19]

Attridge, Jr.

[11] Patent Number: 5,533,929

[45] Date of Patent: Jul. 9, 1996

[54] REMOTELY TRIPPABLE AND RESETTABLE DAMPER

[76] Inventor: Russell G. Attridge, Jr., 6 Horse Hollow Rd., Locust Valley, N.Y. 11560

[21] Appl. No.: 174,976

[22] Filed: Dec. 29, 1993

[51] Int. Cl.[6] .................... F16K 17/40

[52] U.S. Cl. .................... 454/369; 137/79; 251/68

[58] Field of Search .................... 49/2; 137/78.1, 137/78.5, 79; 251/68, 303; 454/257, 357, 369

[56] References Cited

U.S. PATENT DOCUMENTS

| | | | |
|---|---|---|---|
| Re. 32,362 | 2/1987 | McCabe . | |
| 1,924,250 | 8/1933 | McGuire | 251/68 X |
| 2,957,403 | 10/1960 | Krautz . | |
| 3,260,018 | 7/1966 | Schuh | 454/369 X |
| 3,283,691 | 11/1966 | Reiter | 454/369 X |
| 3,580,321 | 5/1971 | Root . | |
| 3,633,600 | 1/1972 | Sadamori | 454/369 X |
| 3,725,972 | 4/1973 | McCabe . | |
| 3,796,248 | 3/1974 | McCabe . | |
| 3,796,249 | 3/1974 | McCabe . | |
| 3,866,656 | 2/1975 | McCabe . | |
| 3,907,020 | 9/1975 | Root . | |
| 3,941,179 | 3/1976 | Root . | |
| 4,040,304 | 8/1977 | McCabe . | |
| 4,041,570 | 8/1977 | McCabe . | |
| 4,074,388 | 2/1978 | McCabe . | |
| 4,080,978 | 3/1978 | McCabe . | |
| 4,081,173 | 3/1978 | McCabe . | |
| 4,099,292 | 7/1978 | McCabe . | |
| 4,114,646 | 9/1978 | McCabe . | |
| 4,146,048 | 3/1979 | McCabe . | |
| 4,213,227 | 7/1980 | McCabe . | |
| 4,219,041 | 8/1980 | McCabe et al. . | |
| 4,219,185 | 8/1980 | McCabe . | |
| 4,241,748 | 12/1980 | McCabe . | |
| 4,263,930 | 4/1981 | McCabe . | |
| 4,283,114 | 8/1981 | Wandrack . | |
| 4,295,486 | 10/1981 | McCabe . | |
| 4,301,569 | 11/1981 | McCabe . | |
| 4,338,967 | 7/1982 | McCabe . | |
| 4,359,934 | 11/1982 | Musacchia | 251/68 X |
| 4,366,830 | 1/1983 | Becelaere . | |
| 4,390,123 | 6/1983 | McCabe . | |
| 4,442,862 | 4/1984 | McCabe . | |
| 4,472,999 | 9/1984 | McCabe . | |
| 4,474,167 | 10/1984 | McCabe . | |
| 4,517,765 | 5/1985 | Mucha . | |
| 4,531,534 | 7/1985 | Magill et al. . | |
| 4,545,363 | 10/1985 | Barchechat et al. . | |
| 4,555,981 | 12/1985 | McCabe . | |
| 4,559,867 | 12/1985 | Van Becelaere et al. | 454/369 |
| 4,581,987 | 4/1986 | Ulicny | 454/369 |
| 4,763,711 | 8/1988 | Hart et al. . | |
| 4,805,261 | 2/1989 | Barchechat . | |
| 4,817,912 | 4/1989 | McCabe . | |
| 4,905,344 | 3/1990 | McCabe . | |
| 4,911,065 | 3/1990 | Van Becelaere | 454/369 |
| 4,919,329 | 4/1990 | McCabe . | |
| 4,928,583 | 5/1990 | Taylor et al. | 454/369 X |

FOREIGN PATENT DOCUMENTS

| | | | |
|---|---|---|---|
| 2414256 | 10/1975 | Germany | 49/2 |

*Primary Examiner*—Harold Joyce
*Attorney, Agent, or Firm*—Hoffmann & Baron

[57] ABSTRACT

A fail-safe closed damper for installation in a system of ducts. The damper includes at least one damper blade connected to a spring-loaded shaft. A power-actuated unit is employed to disengage a coupling which interconnects the spring-loaded shaft to an operating linkage. The use of the power-actuated unit ensures that the damper will be tripped at the appropriate predetermined temperature and will not be affected by the large frictional forces imparted on the components of the damper by the biasing spring or by such external factors as dust, humidity and dirt. The damper also employs a sensor which may be mounted at any remote location within the ventilation system. Alternatively, a plurality of interconnected sensors capable of providing additional sensing capability may be employed.

25 Claims, 8 Drawing Sheets

REMOTELY TRIPPABLE AND RESETTABLE DAMPER

BACKGROUND OF THE INVENTION

The present invention relates to a damper and, more particularly, to a remotely trippable and resettable damper having improved sensing and actuation capabilities.

One damper commonly employed in the art is known as a combination fire and smoke damper. These dampers are typically installed at various locations in a building's ventilation system to prevent circulation of fire and smoke throughout the building during a fire condition. These prior art dampers generally include a damper blade(s) that can be maintained in either an open or a retracted position during normal operating conditions. Each of these dampers must also be capable of sensing a fire condition in the building and, thereafter, releasing or actuating the damper blade(s) to allow such blade(s) to travel to the closed position to provide a wall-like barrier in the ventilation system.

Early dampers, which typically were concerned only with limiting travel of fire through a ventilation system, included an accordion-type blade maintained in a folded state at the top of the damper. For example, U.S. Pat. No. 3,580,321 includes a blade that is maintained in a closure sealed by a hinged door. In a fire condition, the door is opened and the blade falls downward out of the closure due to gravity, thereby limiting travel of fire through the ventilation system.

However, there were several disadvantages with these early dampers. For example, many of them required that the damper blade be manually reset. This made it difficult for emergency personal to ventilate the building after the fire-fighting period. In particular, it is often desirable to be able to control the flow of smoke resulting from a fire in a building. The early fire dampers restricted the fire fighter's ability to accomplish this task because these early dampers, once closed, remained closed until after the fire was extinguished and the damper manually reset.

These early fire dampers also lacked the ability to effectively seal the ventilation duct during a fire condition. Because they operated on a gravity basis, they could not be designed in too tight a manner. In addition, early fire dampers lacked a fail-safe closed mode (i.e., a mode in which the damper blade automatically travels to the closed position in the event of a system malfunction).

Although resettable folding blade dampers are now known in the art, more recent dampers are designed with a rotatable damper blade(s), rather than a plurality of foldable blades. These newer dampers offer several advantages over the folding blade design. Particularly, a tighter seal can be accomplished and maintained with a rotatable-type damper. These same dampers are also more readily adaptable for inclusion of a fail-safe mode.

Rotatable-type dampers are typically designed with a single or a plurality of blades rotatably mounted on or connected to a shaft passing transversely across the damper. When the blades are maintained in an open position (i.e., the blades are aligned parallel to one another), air is free to travel through the ventilation system. However, when the blades are rotated to a closed position, the damper effectively seals off the ventilation system.

One such rotatable-blade damper is disclosed in U.S. Pat. No. 4,301,569. The '569 damper includes a plurality of rotatably-mounted damper blades interconnected by means of a common linkage. The linkage is pivotably connected to a rotatable plate-like member upon which a bi-metallic fire link is mounted. This link couples the plate-like member to a control shaft which is employed to maintain the damper blades in an open position during normal operating conditions. During a fire condition, the bi-metallic strip in the fire link expands outwardly, thereby decoupling the plate-like member from the control shaft. A biasing spring, which is associated with the plate-like member, then drives the member, along with the connected linkage and damper blades, to the closed position.

The structure and operation of the '569 damper produces several disadvantages. For example, the fire link employed in the '569 damper functions as both the fire-sensing means and the release means. Specifically, as the bi-metallic strip is heated, it expands outwardly, thereby decoupling the plate-like member from the control shaft. However, to decouple these components, the bi-metallic strip must overcome the strong friction force imparted on the components by the biasing spring. Because the bi-metallic strip has only a limited expansion force, it may be difficult for such strip to overcome the friction force and release the plate-like member from the control shaft. In addition, if the fire link remains unused for a period of time, factors such as rust, dirt and dust increase the likelihood that the bi-metallic strip will be unable to release the plate-like member from the control shaft. At the minimum, the temperature characteristics of the link will be affected and the damper will not be tripped at the appropriate predetermined temperature.

The '569 damper has a second significant disadvantage. Because the damper employs a bi-metallic strip to both sense a fire condition and release the damper blades, the positioning of the fire sensor is, by necessity, limited to a location on or adjacent the actuating mechanism of the damper. It may prove beneficial, however, to locate the fire sensor at a distance from the damper, or even to employ a plurality of sensors that would improve the sensitivity and reliability of the system.

A third disadvantage associated with the design of the '569 damper concerns the necessity of the actuating mechanism (i.e., the fire-link, plate-like member, etc.) to be located inside the ventilation system. As mentioned, the bimetallic strip, which must be positioned in the ventilation system in order to sense a fire condition, is an integral part of the actuating mechanism. Hence, it is not possible to locate such mechanism outside the ventilation system, (e.g., to avoid exposure to high temperatures) as may be desired in particular installations.

Although the above discussion pertains to combination fire and smoke dampers, dampers are employed in other applications such as the isolation of hazardous gases accidently released in a laboratory facility. Dampers may also be employed to isolate certain regions of a building in preparation for the release of an inert gas such as halon. The dampers employed in these applications suffer from the same drawbacks associated with fire and smoke dampers. In short, a damper design such as the one employed by the '569 device, which relies on a heat-sensitive bimetallic release mechanism, is unable to be utilized in these other applications.

SUMMARY OF THE INVENTION

The present invention, which addresses the needs of the prior art, provides a damper for installation in a system of ducts. The damper includes a damper blade assembly having at least one damper blade operable between an open position and a closed position. The assembly further includes a shaft rotatably supported by the damper and connected to the blade whereby rotation of the shaft moves the blade between the open and closed positions. This shaft is biased to drive the blade to the closed position. The damper also includes remotely operable control means releasably connected to the damper blade assembly for moving the damper blade between the open and closed positions and for holding the damper blade in the open position during normal operating conditions. The damper further includes a power-actuated unit for disengaging the damper blade assembly from the control means. Finally, the damper includes a remotely locatable sensor for sensing an environmental condition in the system. This sensor is operatively connected to the power-actuated unit to provide the unit with a signal in response to the environmental condition whereby the damper blade assembly is disengaged from the control means allowing the damper blade to be driven to the closed position.

The present invention also includes a method for limiting the travel of gas through a system of ducts. The method includes the step of providing a damper for installation in the system. This damper includes a damper blade assembly having at least one damper blade operable between an open position and a closed position. The damper assembly also includes a shaft rotatably supported by the damper and connected to the blade whereby rotation of the shaft moves the blade between the open and closed positions. This shaft is biased to drive the blade to the closed position. The damper also includes remotely operable control means in mechanical communication with the damper blade assembly for moving the damper blade between the open and closed positions. The damper further includes a remotely locatable sensor for sensing a particular environmental condition in the system. The sensor is operatively connected to a power-actuated unit capable of decoupling the damper blade assembly from the control means. Finally, the method includes the step of sensing the environmental condition in the system and providing a signal to the power-actuated unit whereby the power-actuated unit decouples the damper blade assembly from the control means allowing the damper blade to be driven to the closed position.

As a result of the present invention, a damper is provided which ensures that a sufficiently large decoupling force will be applied to the coupling interconnecting the operating linkage and the rotatable shaft to which the damper blade is connected. This same damper is both remotely trippable and remotely resettable. The present invention also provides a damper having a fail-safe closed mode. Further, the present invention provides a damper in which the sensor can be mounted at any location in the system. Alternatively, a plurality of interconnected sensors mounted at a plurality of remote locations can be employed. Further, the present invention provides a damper in which the actuating mechanism can be mounted outside of the duct if desired.

DETAILED DESCRIPTION OF THE INVENTION

Figure 1:
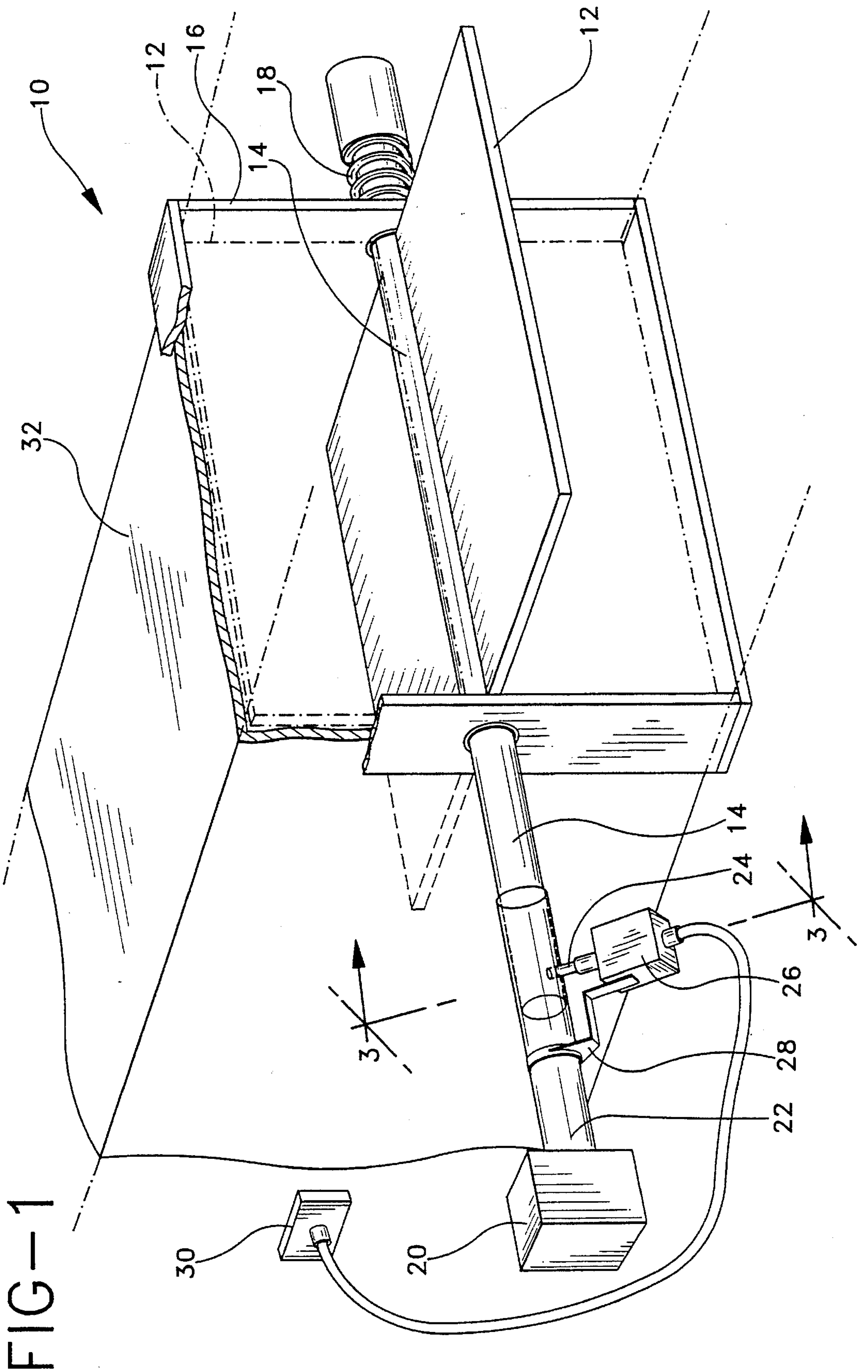
FIG. 1 is a perspective view of the damper of the present invention.

Referring to the drawings, a damper 10 for installation in a system of ducts (e.g., a ventilation system in a building) is shown in FIG. 1. Damper 10 includes a damper blade 12, which is connected to a shaft 14. In turn, shaft 14 is rotatably supported by a damper frame 16. Although the damper illustrated in FIG. 1 includes only one damper blade, the same damper could include a plurality of damper blades.

As mentioned, shaft 14 is rotatably supported by the damper frame. For example, the frame, which is typically of a rectangular cross-section, may include a pair of opposing support bearings (not shown) to rotatably support the shaft, thereby allowing the damper blade connected to the shaft to travel between an open position (shown in solid in FIG. 1) and a closed position (shown in phantom in FIG. 1). In the closed position, the damper blade provides an effective barrier to gases (e.g., smoke) travelling through the system in, for example, a commercial building.

Damper 10 includes a spring 18 connected on one end of shaft 14 for biasing shaft 14 (and the attached damper blade) to the closed position. The other end of spring 18 may be secured, for example, to the frame of the damper. The inclusion of spring 18 in the damper provides such damper with a fail-safe closed mode. In other words, the blade(s) will be driven to the closed position unless the unit is powered open, as described below.

The damper also includes remotely operable control means 20, which is releasably connected to shaft 14 through an operating linkage such as sleeve 22 and a coupling such as rod 24. Together, these components provide the actuating mechanism of the damper.

Rod 24, in turn is operatively connected to a power-actuated unit 26 that is capable of moving the rod between an engaged position with the sleeve and shaft in which the control means is in mechanical communication with the damper blade and a disengaged position with the sleeve and shaft in which the control means is mechanically isolated from the damper blade.

Specifically, when rod 24 is in the engaged position, control means 20, which is in mechanical communication with the damper blade, may be employed to move the damper blade between the open position and the closed position. The control means may also be employed to hold the damper blade in the open position during normal operating conditions.

Preferably, control means 20 constitutes one of the following: a hydraulic motor, a pneumatic motor or an electric motor. Control means 20 engages sleeve 22 and is capable of rotating such sleeve between a first position and a second position. Control means 20 is typically connected to a master control station in the building so that the control means can be remotely operated. Similarly, power-actuated unit 26 preferably constitutes one of the following: a hydraulic motor, a pneumatic motor or a solenoid.

Preferably, sleeve 22 and shaft 14 are telescopically arranged to allow such components to be readily coupled to one another. In the embodiment shown in FIG. 1, shaft 14 extends within sleeve 22. Power-actuated unit 26 is preferably mounted on an arm 28 fixed to sleeve 22. Accordingly, as sleeve 22 is rotated by control means 20 between its first position and its second position, power-actuated unit 26, which is fixedly attached thereto, also rotates between a first position and a second position. Of course, other means of rotatably locking sleeve 22 to shaft 14 are also contemplated. It is further contemplated that other sleeve/shaft arrangements may be employed in the present invention.

Damper 10 also includes a sensor 30 for sensing a particular environmental condition (e.g., a temperature rise in the duct indicating a fire condition) in the system. The sensor is operatively connected to power-actuated unit 26 to provide the unit with a signal (e.g., the application or removal of power) in response to the environmental condition whereby rod 24 is disengaged from the sleeve and shaft allowing the damper blade to be driven to the closed position. The present invention allows a plurality of sensors to be employed with the damper. Specifically, sensors can be positioned at several key positions in the system and interconnected in such a fashion that if any one of the sensors is tripped, the damper will be actuated (i.e., the blade will be driven to the closed position).

Figure 2:
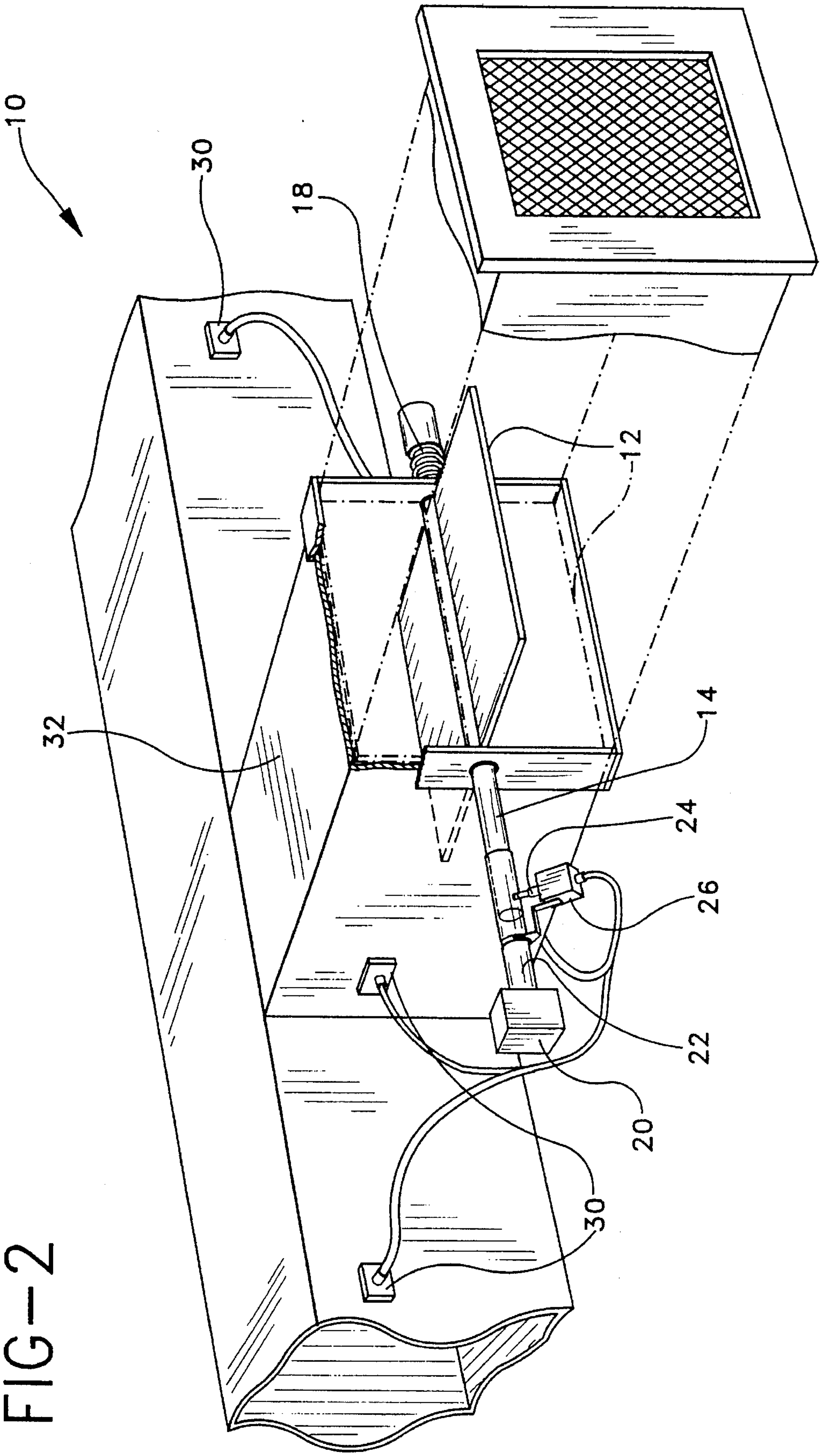
FIG. 2 is a perspective view of a damper employing a plurality of sensors and which is installed at a juncture in a duct system.

For example, as shown in FIG. 2, a damper may be installed at a juncture in a ventilation system. In such an arrangement, it may prove beneficial to position sensors at each of the three locations depicted in FIG. 2. With respect to a combination fire and smoke damper, this would ensure that fire and smoke travelling through the ventilation system was sensed at the earliest possible time. Particularly, if a smoke sensor is employed, the damper will be tripped much earlier than those prior art devices which rely only on a heat-sensitive bi-metallic strip. In other words, the sensor in these prior art devices must be exposed to a sufficiently high temperature to be tripped. Stated differently, the fire must approach the bi-metallic strip to heat the strip to its actuation temperature.

In contrast, the damper of the present invention, if employed as a combination fire/smoke damper, may be outfitted with a smoke sensor, among others. This smoke sensor would allow the damper to react to a fire condition in a remote region of the building. Particularly, the smoke sensor would sense the smoke resulting from the fire condition and trip the damper. As a result, the damper or dampers would be tripped at a much earlier point in time than had such damper relied only on heat-sensitive sensors.

Of course, the locations at which the sensors of the present invention may be positioned are not limited to those shown in FIG. 2. As noted, the design of the present invention allows many types of sensors to be utilized. For example, the damper of the present invention may utilize a bi-metallic strip to sense a fire condition, a smoke sensor capable of sensing smoke travelling through the system, a sensor capable of sensing the presence of a hazardous gas or a combination thereof. In short, the present invention, because of its design, allows the damper to be employed in several varied applications.

As shown in FIGS. 1 and 2 the actuating mechanism of the present invention, which includes control means 20, sleeve 22, rod 24 and power-actuated unit 26, is located outside of the duct in which the damper is installed. This arrangement allows the above-mentioned components to be easily accessed for maintenance and inspection. This also limits the exposure of the components to high temperatures during a fire condition. Further, by positioning the actuating components outside the duct, air flow through the ventilation system is disturbed to a much lesser extent. Of course, the actuating mechanism of the present invention could be located inside the duct if, for example, the construction of a building did not provide sufficient space to locate such mechanism outside the duct or if the design specifications required such an arrangement.

The operation of damper 10 will now be described. To begin, the damper is installed at an appropriate location in a system of ducts, for example, in ventilation duct 32 shown in FIG. 1. A typical air ventilation system may include a plurality of such dampers arranged at various positions throughout the system. Further, the dampers may be sealingly installed in the system so that an effective barrier is created when the damper blade(s) is in the closed position.

The remotely operable control means, which is connected to shaft 14 through sleeve 22 and rod 24, is employed to move the damper blade from the normally closed position (due to the biasing effect of spring 18) to the open position and to hold the damper blade in such open position during normal operating condition. (A loss of power results in the fail-safe closed mode mentioned above). As discussed, the remotely operable control means is typically connected to a master control station in the building. From the master control station, an authorized fire-fighting person can selectively open and close the various dampers to facilitate the removal of smoke from the building.

Figure 3:
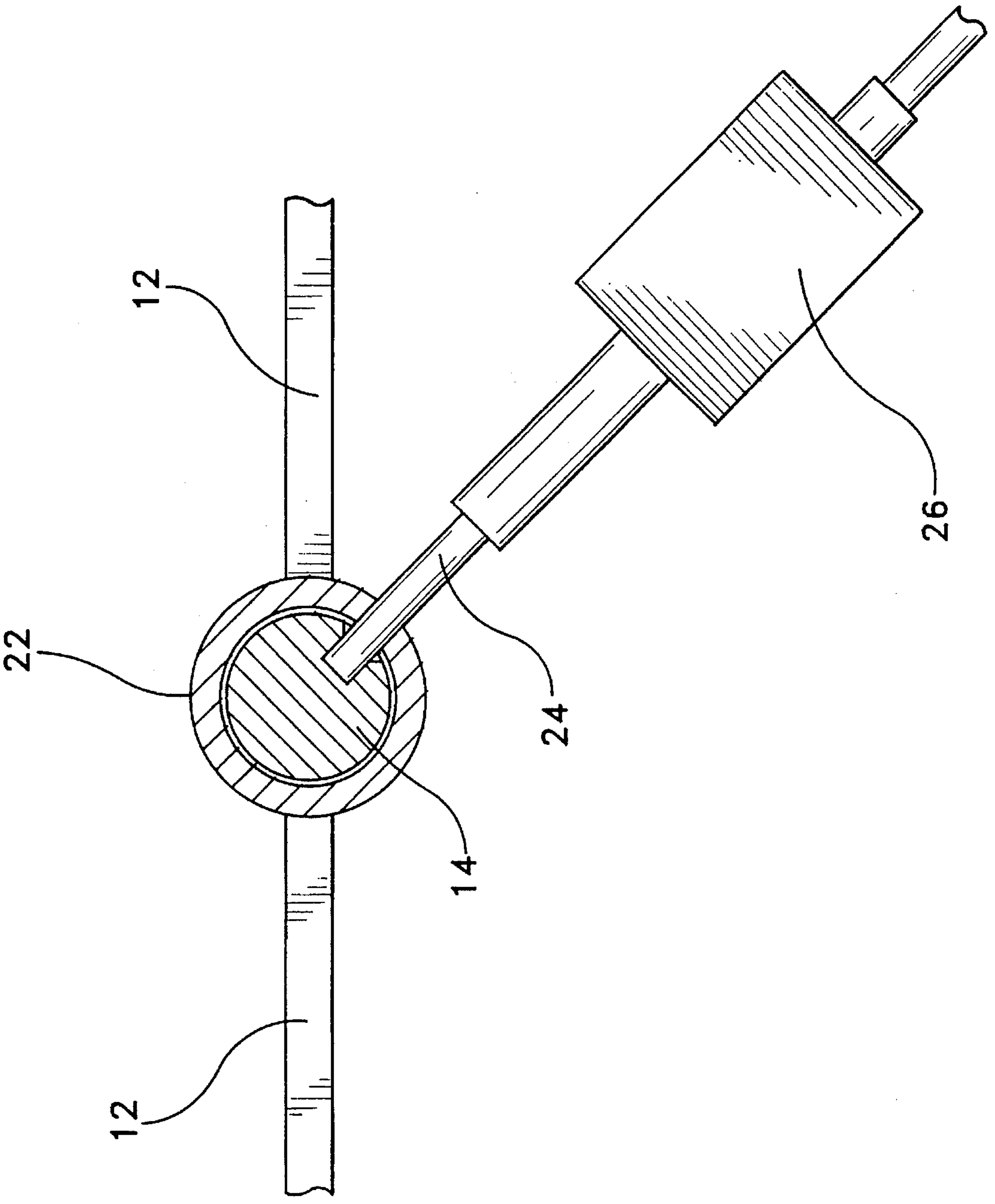
FIG. 3 is an enlarged cross-section of the actuating mechanism of the present invention showing the coupling in its engaged position.

As described above, the control means and sleeve are capable of being rotatably locked to shaft 14 through rod 24. In turn, rod 24 is controlled by power-actuated unit 26, which is capable of moving the rod between an engaged position and a disengaged position with sleeve 20 and shaft 14 (see FIGS. 3–4). Particularly, rod 24 may be extended into notch 34 of shaft 14. As also described, unit 26 is operatively connected to sensor 30. The design of the present invention, unlike the dampers of the prior art, allows sensor 30 to be positioned at a location remote from the damper. This flexibility allows the engineer designing the system to position the sensor at a location likely to provide early warning of a particular environmental condition (e.g., a fire condition) in the duct system. As also described, a plurality of sensors can be positioned at various locations throughout the system and interconnected so that if any one of the sensors is tripped, the damper will be actuated. The use of plural sensors increases the sensing capability of the system and also, at the same time, provides an additional level of safety, i.e., if one sensor fails to operate, a second sensor can still trip the damper. Finally, the system may employ a sensor capable of sensing the presence of smoke or of a particular hazardous gas.

When the environmental condition is sensed in the system by sensor 30, a signal is sent from the sensor to power-actuated unit 26. Because of the large rotational force imparted on shaft 14 by spring 18, a similarly large friction force is imparted on rod 24. However, as mentioned, power-actuated unit 26 is preferably of a pneumatic or electrical design and is capable of providing a large decoupling force to rod 24. In one preferred embodiment, the sensor interrupts a power source being supplied to the power-actuated unit. During normal operating conditions, the source provides power to the unit to maintain the rod in its engaged position. When the power is removed, a strong spring force, for example, may be employed to retract the rod into the unit.

Figure 4:
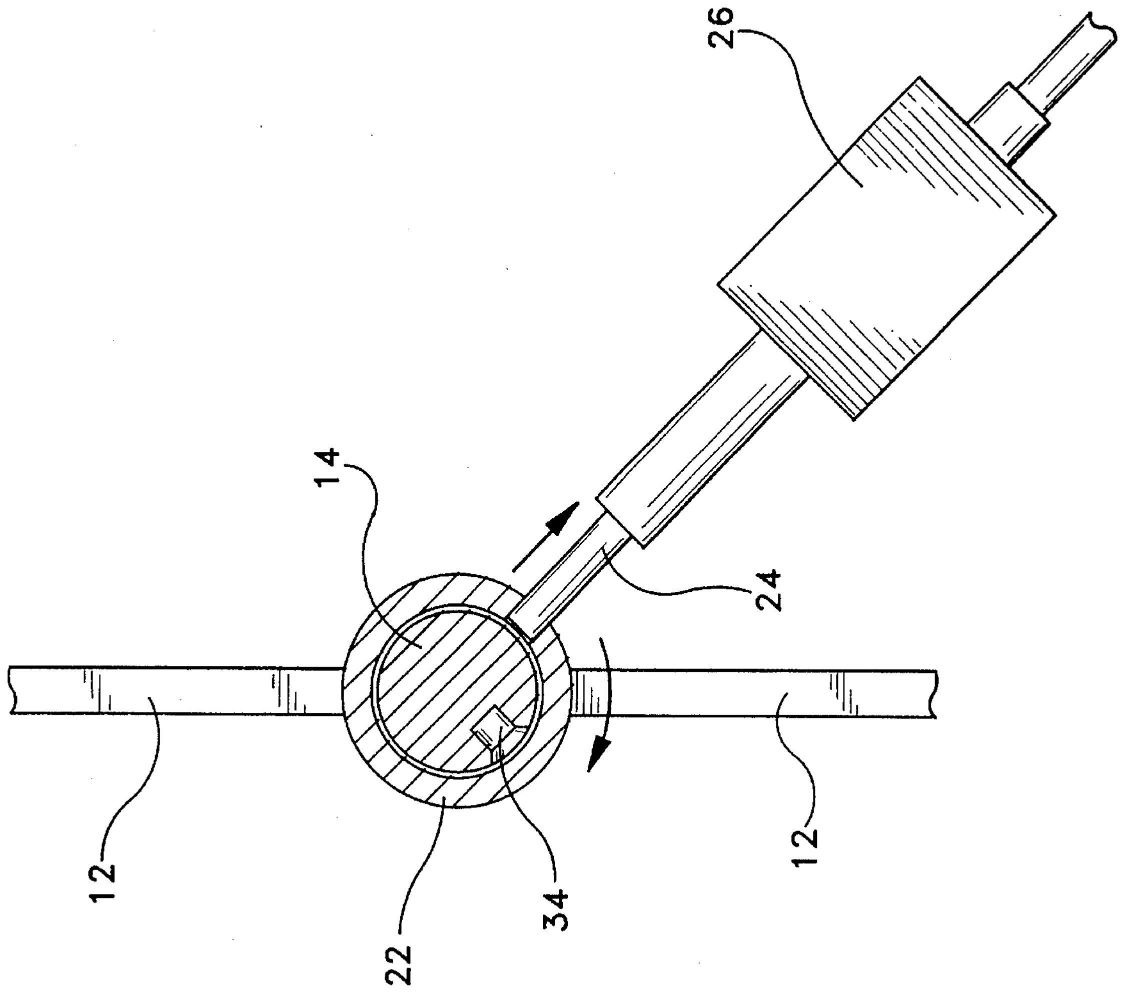
FIG. 4 is a view similar to FIG. 3 showing the coupling in its disengaged position.

As mentioned, when power-actuated unit 26 receives a signal from sensor 30, the unit retracts rod 24, thereby rotatably unlocking the shaft from the sleeve (see FIG. 4). Although control means 20 maintains the sleeve in the same position, shaft 14 and damper blade 12 are driven to the closed position by spring 18 once rod 24 is retracted. As part of the fail-safe closed mode, the system may be designed such that rod 24 is also retracted under loss-of-power conditions.

In one preferred embodiment, sensor 30 includes a bi-metal disk actuated switch. The switch, in response to a fire condition, may bleed down a control signal (either hydraulic or pneumatic) supplied to the power-actuated unit or may open an electric circuit between the solenoid and a power source.

After the temperature in the ventilation system drops to a temperature below the actuation temperature of the sensor, power-actuated unit 26 and sleeve 22 are rotated so that rod 24 is re-aligned with notch 34 in shaft 14. Rod 24 is then extended outward to re-engage sleeve 22 and shaft 14. Once rod 24 is re-engaged, control means 20 is employed to reopen the damper, i.e., damper blade 12 is moved from the closed position to the open position.

Figure 5:
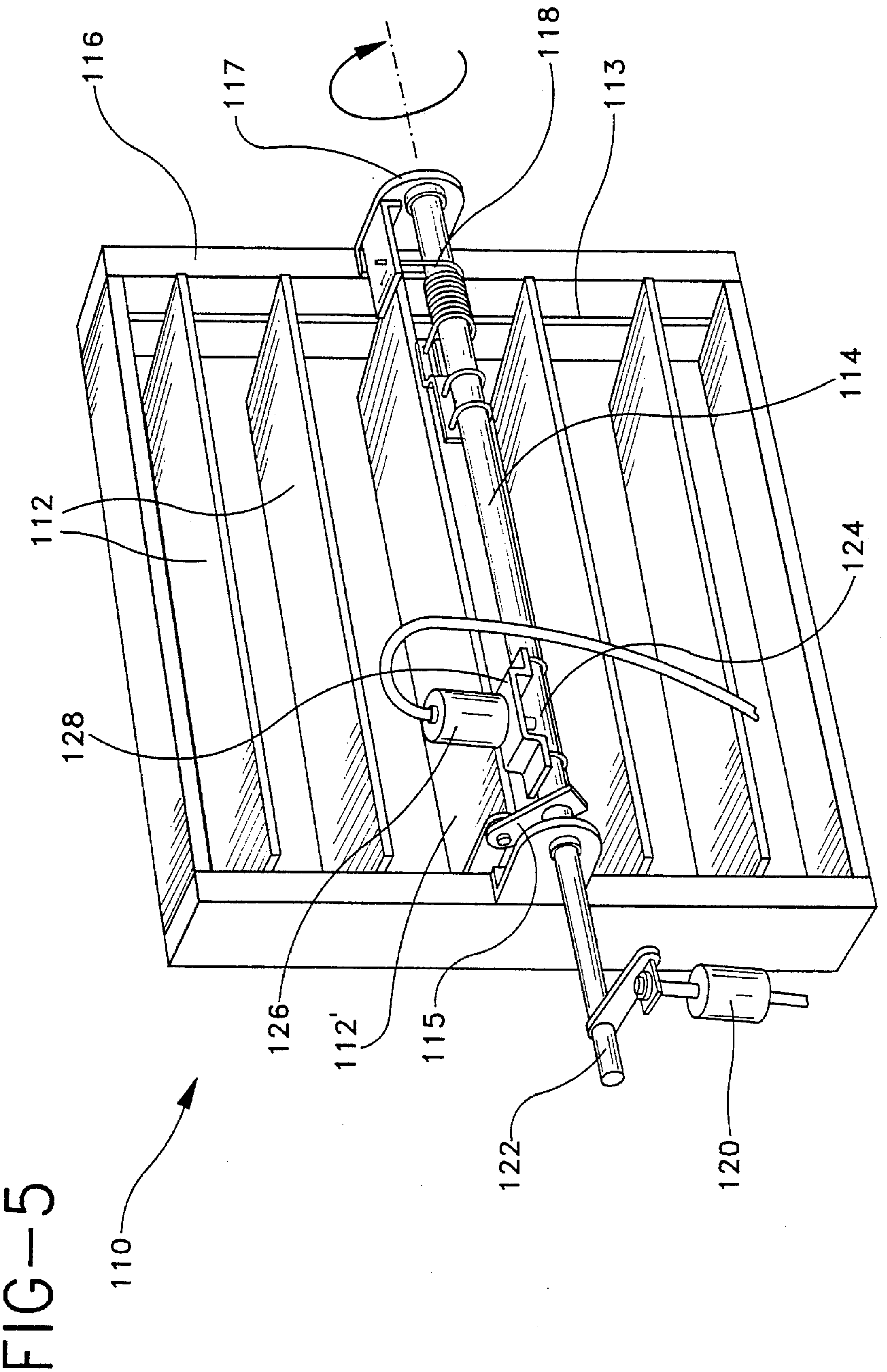
FIG. 5 is a perspective view of an alternative embodiment of the present invention.
Figure 6:
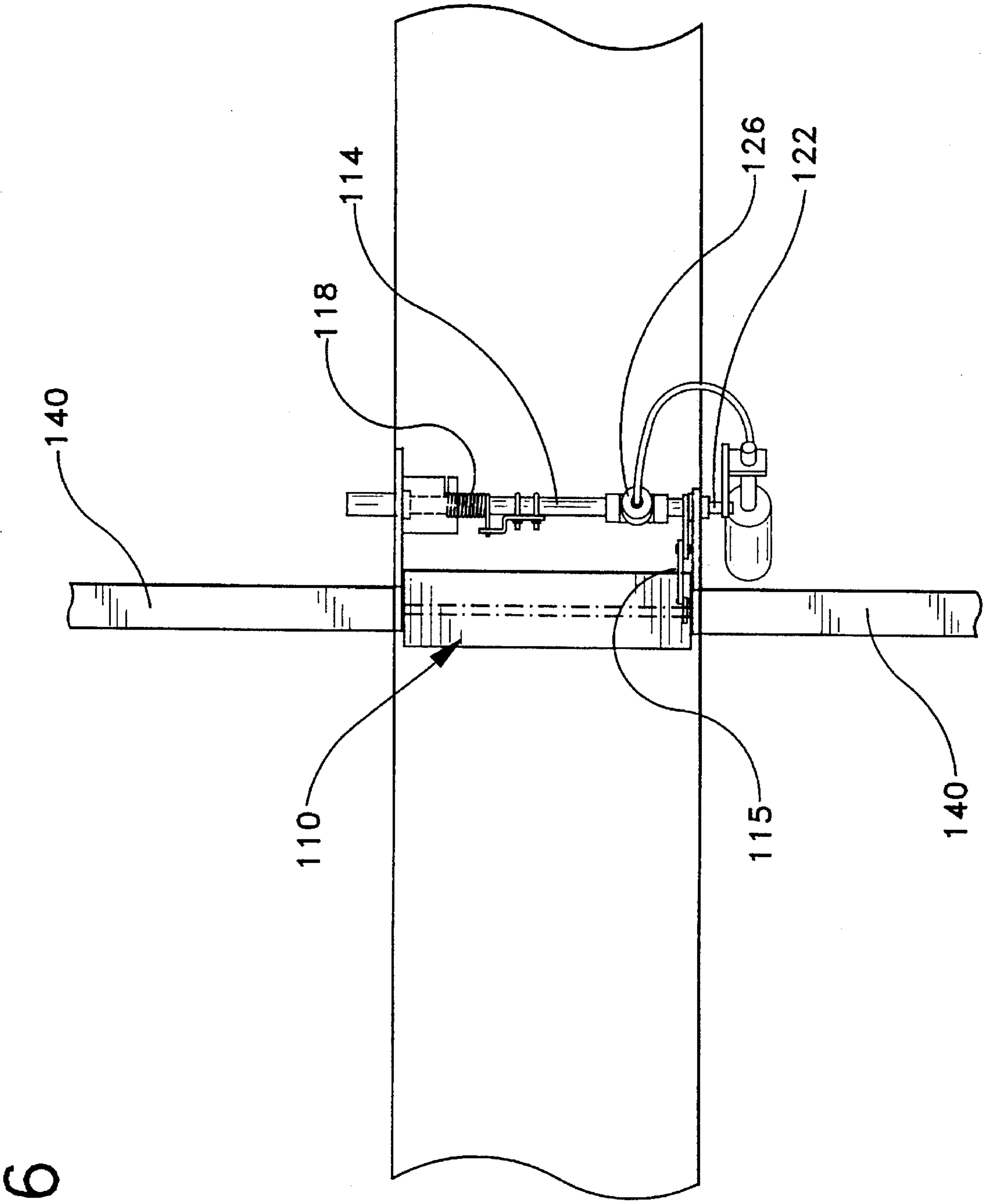
FIG. 6 is a top plan view of the embodiment of FIG. 5 depicting such embodiment installed in a firewall.

In a preferred embodiment, (as shown in FIGS. 5–6) the damper, i.e., damper 110, includes a plurality of damper blades 112. The blades are interconnected by a common linkage 113 such that all of the blades cooperate as one integral unit.

The centrally-located blade, i.e. blade 112' is connected to shaft 114 through arm 115. Accordingly, as shaft 114 is rotated, arm 115 drives blades 112 between an open and closed position. Mounted to frame 116 is a bracket 117. A spring 118, which is connected between shaft 114 and bracket 117, imparts a rotational force to shaft 114, tending to drive the connected blades to the closed position.

Remotely operable control means 120, which in a preferred embodiment may constitute a pneumatic cylinder, is positioned to rotatably drive operating linkage 122. Operating linkage 122 has an outer diameter smaller than the inner diameter of shaft 114 such that operating linkage 122 may extend within shaft 114. Of course, other arrangements are also contemplated. Preferably, operating linkage 122 is rotatably coupled to shaft 114 through a coupling 124.

In turn, coupling 124 is operatively connected to a power-actuated unit 126 that is capable of moving the coupling between an engaged position with operating linkage 122 and shaft 114 in which control means 120 is in mechanical communication with the damper blades and a disengaged position with the operating linkage and shaft in which the control means is mechanically isolated from the damper blades. As shown, power-actuated unit 126 may be attached to shaft 114 by means of a mounting plate 128.

Specifically, when coupling 124 is in the engaged position, control means 120, which is in mechanical communication with the damper blades, may be employed to move the damper blades between the open position and the closed position. The control means may also be employed to hold the damper blades in the open position during normal operating conditions.

Damper 110 also includes a sensor (not shown) for sensing a particular environmental condition (e.g., a fire condition) in the duct system. The sensor is operatively connected to power-actuated unit 126 to provide the unit with a signal in response to the environmental condition whereby the coupling is disengaged from the operating linkage and shaft allowing the blades to be driven to the closed position.

When employed as a fire damper, the blades of the damper are generally fabricated from a high temperature material such as steel. The damper blades are typically designed to sealingly engage the frame of the damper when in the closed position, thereby limiting passage of smoke therethrough. Finally, as shown in FIG. 6, the damper is preferably installed within an opening in a firewall 140. The embodiment of the present invention illustrated in FIGS. 5 and 6 facilitates such an installation in that the actuating mechanism of the damper (i.e., shaft 114, spring 118, control means 120, operating linkage 122, coupling 124 and power-actuated unit 126) are positioned forward of the frame of the damper so that they do not interfere with the fire wall.

During the installation stage of either damper 10 or damper 110, it is oftentimes desirable to open the blades of the damper to allow circulation of air through the ducts. This task can prove rather difficult prior to the installation and set-up of the remotely operable control means and the power-actuated unit, which are employed to operate the damper during normal use. Particularly, an individual who attempts to manually open the blades of the damper may damage such blades in the attempt.

Figure 7:
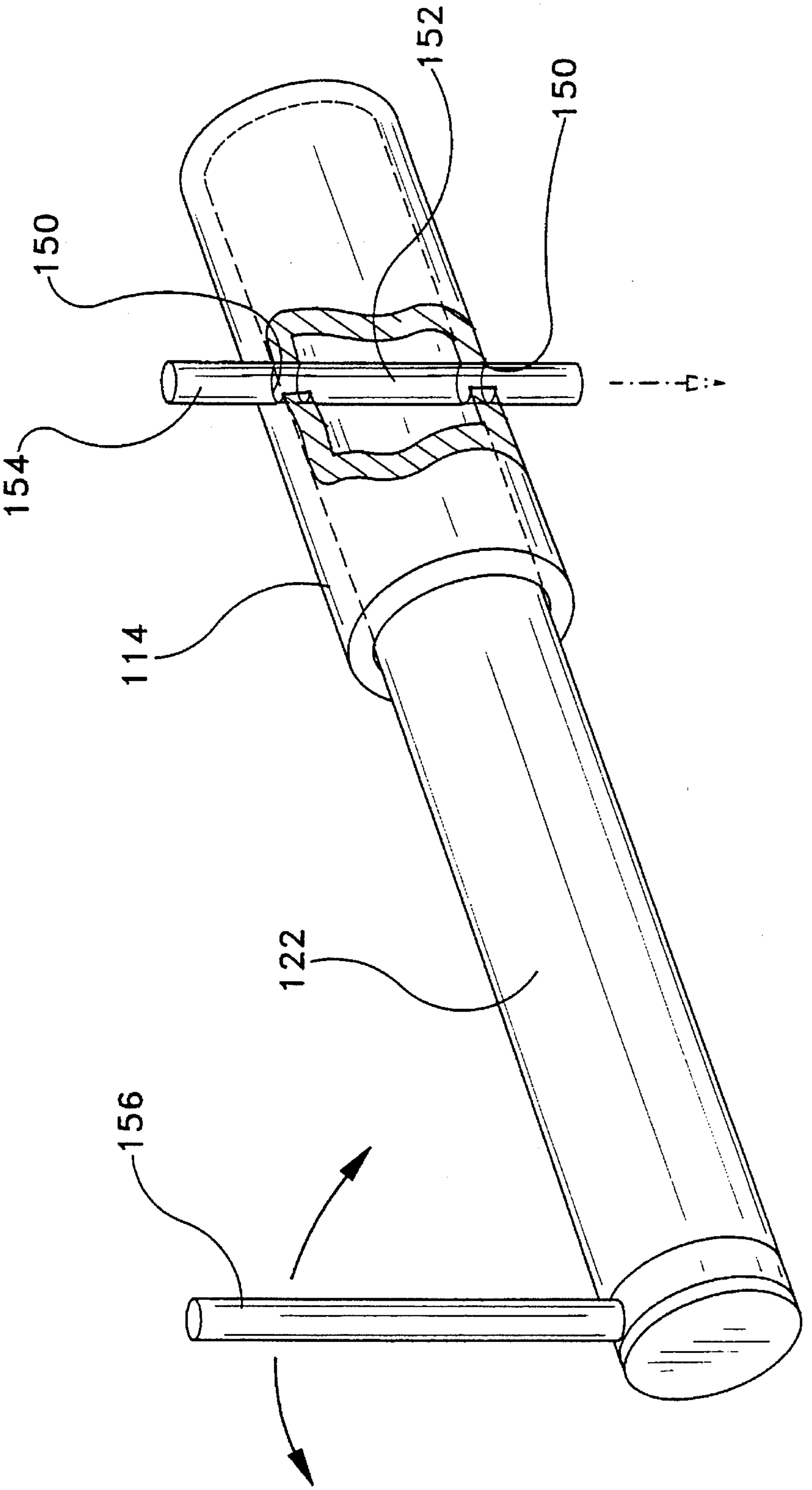
FIG. 7 shows an alternative embodiment of the actuating mechanism wherein such mechanism includes a slot for receipt of a retaining pin.

Accordingly, as shown in FIG. 7, shaft 114 may be provided with openings 150, which may be aligned with a slot 152 formed in the operating linkage. An individual is therefore able to align the openings with the slot and, thereafter, insert a retaining pin 154 through the two members, thereby rotatably locking the two members together. A handle 156 may then be removably attached to the operating linkage of the damper such that the damper blades can be manually operated by rotation of the handle. As will be appreciated by those skilled in the art, retaining pin 154 will be maintained in slot 152 due to the rotational force imparted on such pin by shaft 114.

Figure 9:
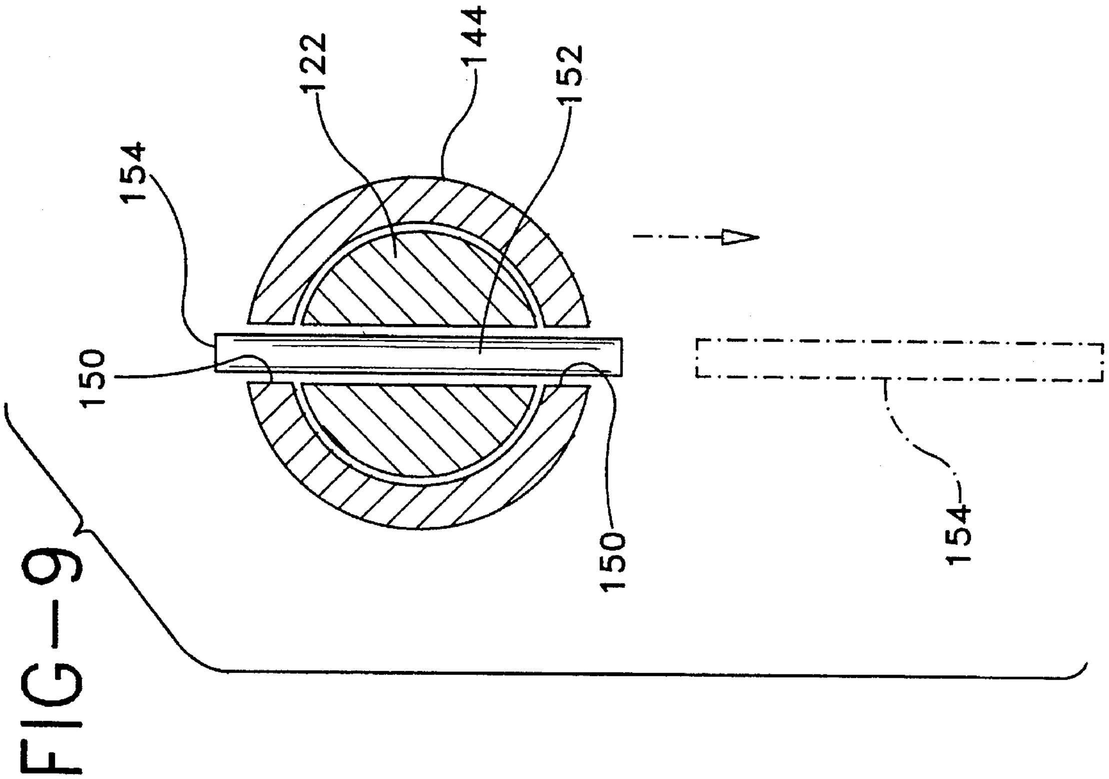
FIG. 9 is a cross-sectional view depicting the release of the retaining pin from the slot in the shaft.
Figure 8:
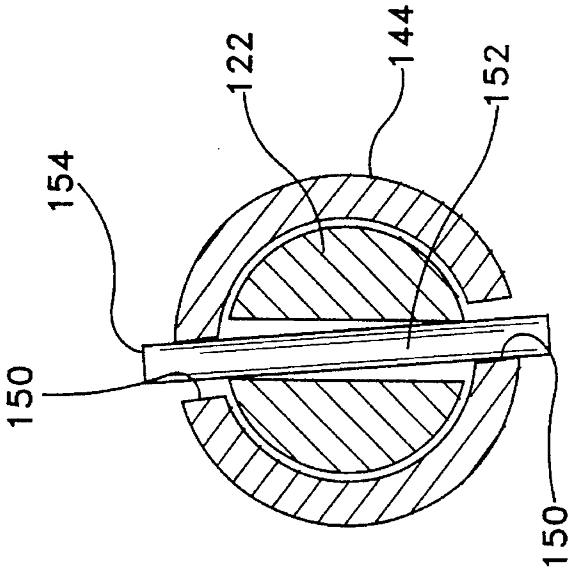
FIG. 8 is a cross-sectional view depicting the retaining pin wedged between the operating linkage and the shaft.

In a preferred embodiment, slot 152 is arranged in operating linkage 122 such that the slot is positioned in a vertical orientation when the blades are closed. When shaft 114 is rotated by handle 156, as shown in FIG. 8, pin 154 becomes wedged in the slot, thereby rotatably locking shaft 114 to operating linkage 122. As a result of this arrangement, the retaining pin will automatically fall out of slot 152 (see FIG. 9) once the damper blades are returned to the closed position. This ensures that retaining pin 154, which is designed to temporarily lock shaft 114 to linkage 122, is not accidentally left in the slot following the installation of the damper.

Of course, other pin designs and configurations are also contemplated. For example, a spring-loaded pin could be employed. Alternatively, a cotter pin or headed pin may also be employed, although such pins would require manual removal. Other means for temporarily locking shaft 114 to the operating means are also contemplated.

Thus, while there have been described what are presently believed to be the preferred embodiments of the invention, those skilled in the art will realize that various changes and modifications may be made to the invention, and it is intended to claim all such changes and modifications which fall within the scope of the invention.

What is claimed is:

1. A remotely trippable and resettable damper for installation in a system of ducts, comprising:

a damper blade assembly having at least one damper blade operable between an open position and a closed position and a shaft rotatably supported by said damper and connected to said blade whereby rotation of said shaft moves said blade between said open and closed positions, said shaft being biased to drive said blade to said closed position;

remotely operable control means releasably connected to said damper blade assembly for moving said damper blade between said open and closed positions and for holding said damper blade in said open position during normal operating conditions;

a power-actuated unit for disengaging said damper blade assembly from said control means;

means for remotely re-engaging said damper blade assembly to said control means following a tripping of said damper; and a remotely locatable sensor for sensing an environmental condition in said system, said sensor operatively connected to said power-actuated unit to provide said power-actuated unit with a signal in response to said condition whereby said damper blade assembly is disengaged from said control means allowing said damper blade to be driven to said closed position.

2. The damper according to claim 1, further comprising a coupling for releasably interconnecting said control means and said damper blade assembly; and wherein said power-actuated unit is operatively connected to said coupling for moving said coupling between an engaged position with said control means and said damper blade assembly in which said control means is in mechanical communication with said damper blade and a disengaged position with said control means and said damper blade assembly in which said control means is mechanically isolated from said damper blade.

3. The damper according to claim 1, further comprising an operating linkage interposed between said shaft and said control means and telescopically arranged with respect to said shaft; and further comprising a coupling for releasably interconnecting said operating linkage and said shaft; and wherein said power-actuated unit is operatively connected to said coupling to allow said power-actuated unit to move said coupling between an engaged position with said operating linkage and said shaft and a disengaged position with said operating linkage and said shaft.

4. The damper according to claim 3, wherein said coupling is arranged to retract into said power-actuated unit under loss of power conditions.

5. The damper according to claim 3, wherein said coupling is a rod configured to slidably engage both said operating linkage and said shaft.

6. The damper according to claim 3, further comprising means for temporarily interlocking said shaft to said operating linkage.

7. The damper according to claim 6, wherein said interlocking means includes a slot formed in said operating linkage and at least one opening formed in said shaft, and further including a retaining pin dimensioned for insertion into said slot when said slot is rotatably aligned with said opening.

8. The damper according to claim 1, further comprising a spring connected to said shaft for biasing said blade to said closed position.

9. The damper according to claim 1, wherein said sensor is mounted at a position remote from said damper.

10. The damper according to claim 1, wherein said sensor comprises a bi-metal disk actuated switch.

11. The damper according to claim 10, wherein said switch opens an electric switch in response to a fire condition.

12. The damper according to claim 10, wherein said switch bleeds down a pneumatic signal supplied to said power-actuated unit in response to a fire condition.

13. The damper according to claim 1, wherein said sensor comprises a switch responsive to the presence of smoke.

14. The damper according to claim 1, wherein said sensor comprises a switch responsive to the presence of a hazardous gas.

15. The damper according to claim 1, further comprising a plurality of interconnected sensors mounted at a plurality of positions in said system.

16. The damper according to claim 1, wherein said shaft is laterally offset from said damper to allow said damper to be installed in a firewall.

17. The damper according to claim 1, wherein said control means is selected from the group consisting of a hydraulic motor, a pneumatic motor and an electric motor.

18. The damper according to claim 1, wherein said power-actuated unit is selected from the group consisting of a hydraulic motor, a pneumatic motor and a solenoid.

19. A method for limiting travel of gas through a system of ducts, comprising:

providing a remotely trippable and resettable damper for installation in said system, said damper including i) a damper blade assembly having at least one damper blade operable between an open position and a closed position and a shaft rotatably supported by said damper and connected to said blade whereby rotation of said shaft moves said blade between said open and closed positions, said shaft being biased to drive said blade to said closed position;

ii) remotely operable control means in mechanical communication with said damper blade assembly for moving said damper blade between said open and closed positions;

iii) a remotely locatable sensor for sensing a particular environmental condition in said system, said sensor operatively connected to a power-actuated unit capable of decoupling said damper blade assembly from said control means;

iv) means for recoupling said damper blade assembly to said control means following a tripping of said damper; and sensing said condition in said system and providing a signal to said power-actuated unit whereby said power-actuated unit decouples said damper blade assembly from said control means allowing said damper blade to be driven to said closed position.

20. The method according to claim 19, wherein said damper includes a coupling for releasably interconnecting said control means and said damper blade assembly; and further comprising the step of disengaging said coupling from said control means and said damper blade assembly whereby said damper blade is driven to said closed position.

21. The method according to claim 19, wherein said sensor comprises a bi-metal disk actuated switch responsive to a fire condition, and further comprising the step of sensing a fire condition in said system.

22. The method according to claim 19, wherein said sensor comprises a switch responsive to the presence of smoke, and further comprising the step of sensing said smoke in said system.

23. The method according to claim 17, wherein said sensor comprises a switch responsive to the presence of a hazardous gas, and further comprising the step of sensing said hazardous gas in said system.

24. The method according to claim 17, further comprising the step of mounting said sensor at a position remote from said damper.

25. The method according to claim 19, further comprising the step of mounting a plurality of interconnected sensors at a plurality of positions in said system.

* * * * *